United States Patent
Fernandez

(10) Patent No.: US 10,607,586 B2
(45) Date of Patent: *Mar. 31, 2020

(54) COLLABORATIVE SYNCHRONIZED AUDIO INTERFACE

(71) Applicant: Jose Mario Fernandez, Santa Ana, CA (US)

(72) Inventor: Jose Mario Fernandez, Santa Ana, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/967,345

(22) Filed: Apr. 30, 2018

(65) Prior Publication Data

US 2018/0247627 A1 Aug. 30, 2018

Related U.S. Application Data

(63) Continuation-in-part of application No. 15/588,413, filed on May 5, 2017, now Pat. No. 9,959,851.

(60) Provisional application No. 62/332,029, filed on May 5, 2016.

(51) Int. Cl.

| G10H 1/00 | (2006.01) |
|---|---|
| G10H 1/36 | (2006.01) |
| G06F 13/38 | (2006.01) |
| H04N 21/43 | (2011.01) |
| H04N 21/439 | (2011.01) |
| H04N 21/81 | (2011.01) |

(52) U.S. Cl.
CPC ......... *G10H 1/0066* (2013.01); *G06F 13/385* (2013.01); *G10H 1/36* (2013.01); *G06F 2213/0042* (2013.01); *G10H 2240/285* (2013.01); *G10H 2240/325* (2013.01); *H04N 21/4302* (2013.01); *H04N 21/4394* (2013.01); *H04N 21/8113* (2013.01)

(58) Field of Classification Search
CPC ...... G10H 1/0066; G10H 1/36; G06F 13/385; G06F 2213/0042
USPC .......................................................... 84/645
See application file for complete search history.

(56) References Cited

U.S. PATENT DOCUMENTS

| 7,297,856 | B2 | 11/2007 | Sitrick | |
|---|---|---|---|---|
| 7,504,576 | B2* | 3/2009 | Georges | G10H 1/0025 84/603 |
| 8,035,020 | B2 | 10/2011 | Taub | |
| 9,959,851 | B1* | 5/2018 | Fernandez | G10H 1/0066 |
| 2002/0026256 | A1 | 2/2002 | Hilton | |
| 2009/0068943 | A1 | 3/2009 | Grandinetti | |
| 2009/0113022 | A1 | 4/2009 | Quoc | |
| 2009/0193345 | A1 | 6/2009 | Wensley | |
| 2010/0306667 | A1* | 12/2010 | Umeo | G08C 19/00 715/740 |

(Continued)

*Primary Examiner* — David S Warren

(74) *Attorney, Agent, or Firm* — Plager Schack LLP; Mark H. Plager; Alexis J. Saenz

(57) ABSTRACT

A system and method eliminate the drag associated with CPU drag on experienced by combine audio streams from multiple sources. The embodiments receive audio signals from two separate audio sources and apply a MIDI based timing signature to the audio signals. The audio signals are synchronized according to the MTC signature signal and combined, when synchronized, at a summing module for output as a combined audio stream. Some embodiments include monitoring for and publishing a start/stop command signal to users in the collaboration to help synchronize audio signals from the different users.

12 Claims, 6 Drawing Sheets

(56) References Cited

U.S. PATENT DOCUMENTS

| | | | | |
|---|---|---|---|---|
| 2011/0252951 | A1* | 10/2011 | Leavitt | G10H 1/40 |
| | | | | 84/645 |
| 2013/0275312 | A1 | 10/2013 | Claman | |
| 2013/0305903 | A1* | 11/2013 | Fong | G10H 1/26 |
| | | | | 84/609 |
| 2014/0109750 | A1* | 4/2014 | Reynolds | G09B 15/00 |
| | | | | 84/612 |
| 2014/0337420 | A1 | 11/2014 | Wentzloff | |
| 2015/0068388 | A1* | 3/2015 | Fong | G10H 1/26 |
| | | | | 84/609 |
| 2016/0012807 | A1* | 1/2016 | Neuhauser | G06F 17/28 |
| | | | | 704/203 |
| 2016/0125863 | A1* | 5/2016 | Henderson | G10H 1/0058 |
| | | | | 700/94 |
| 2017/0011725 | A1* | 1/2017 | Reynolds | G09B 15/00 |
| 2018/0047374 | A1* | 2/2018 | Numata | G11B 27/34 |
| 2018/0061381 | A1* | 3/2018 | Zonnefeld | G10G 1/00 |
| 2018/0199859 | A1* | 7/2018 | Dalla Bella | G16H 50/30 |
| 2018/0247627 | A1* | 8/2018 | Fernandez | G10H 1/0066 |

\* cited by examiner

COLLABORATIVE SYNCHRONIZED AUDIO INTERFACE

CROSS REFERENCE TO RELATED APPLICATIONS

This application claims priority to provisional patent application U.S. Ser. No. 62/322,029 filed on May 5, 2016, and U.S. application Ser. No. 15/588,413 filed on May 5, 2017, the entire contents of which are herein incorporated by reference.

FIELD OF THE INVENTION

The present invention is directed generally toward electronic music based systems, and more particularly, to a collaborative synchronized audio interface.

BACKGROUND OF THE INVENTION

Currently, previous approaches to electronic collaboration of musical pieces involve two distinct parties generating their own respective audio files. When attempting to synchronize one audio file with another, CPU timing can be off by 0.1% in a 99 bpm song. In just four bars, the timing can thus vary from 99-101 bpm. As will be appreciated, the output, when combined produces an inferior piece of music. Signal degradation also becomes an issue when users have to covert DA/AD in current configurations to combine outputs through traditional means.

Therefore, it may be desirable to provide a system and method which address the above-referenced problems.

SUMMARY OF THE INVENTION

Accordingly, a system is included for an audio processing system for providing collaborative input of music streams. The system comprises a housing including a first USB audio input hub for receiving a first audio signal from a first digital audio workstation, a second USB audio input hub for receiving a second audio signal from a second digital audio workstation, and a musical instrument digital interface (MIDI) timing engine coupled to the first USB audio input hub and the second USB audio input hub. The MIDI timing engine generates a MIDI time code (MTC) timing signature signal provided to the first USB audio input hub and to the second USB audio input hub. The system also includes a controller coupled to the MIDI timing engine to synchronize transmission of the first audio signal from the first digital audio workstation through the first USB audio input hub with the second audio signal from the second digital audio workstation through the second USB audio input hub. A summing module coupled to the first USB audio input hub and to the second USB audio input hub sums the synchronized output of the first audio signal from the first digital audio workstation from the first USB audio input hub with the second audio signal from the second digital audio workstation from the second USB audio input hub, and outputs the synchronized and summed first audio signal and second audio signal as a combined audio signal. The system may also include a software application executed by the controller to: monitor for a synchronization command registered by the first digital audio workstation, send the synchronization start/stop command to the controller, and publish the synchronization start/stop command to the second digital audio workstation for a synchronized start/stop event.

A method of providing collaborative input of music streams comprises receiving at a first USB audio input interface, a first audio signal from a first digital audio workstation, receiving at a second USB audio input interface, a second audio signal from a second digital audio workstation, receiving a user input at a controller to synchronize the first audio signal with the second audio signal; generating, in response to the received user input at the controller, a musical instrument digital interface (MIDI) time code (MTC) timing signature signal; broadcasting the MTC timing signature signal simultaneously to the first USB audio input interface and to the second USB audio input interface; monitoring for a synchronization command registered by the first digital audio workstation; publishing the synchronization command from the first digital audio workstation to the second digital audio workstation; receiving a start/stop command from the second digital workstation in response to receiving the synchronization command; starting/stopping receipt of the second audio signal from the second digital audio workstation; combining the first audio signal with the second audio signal in synchronization according to the MTC timing signature signal and the starting/stopping receipt of the second audio signal; and outputting the combined and synchronized first audio signal and second audio signal as a combined audio stream.

It is to be understood that both the foregoing general description and the following detailed description are exemplary and explanatory only and are not restrictive of the invention claimed. The accompanying drawings, which are incorporated in and constitute a part of the specification, illustrate embodiments of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Embodiments of the invention may eliminate or at least mitigate the drag associated with CPU drag experienced by combining audio streams from multiple sources. As will be appreciated, aspects of the embodiments disclosed reduce CPU jitter in timing to 0.01%. Collaboration becomes streamlined so that professional studios can reduce DA/AD conversions from auxiliary input needs.

In general, embodiments receive audio signals from two separate audio sources such as digital audio workstations (DAWs) that generate their own respective audio signals by their own respective processors. Typically, CPU drag may be seen when the signals are input into a common prior art interface. However as will be appreciated in the present embodiments disclosed, a MIDI based timing signature is applied to the separate audio signals within the system. The audio signals are synchronized based on an MTC signature signal and combined, when synchronized, at a summing module for output as a combined audio stream. The MTC timing signature adjusts the timing of transmission for each of the two audio signals before summing them so that the intended synchronization is achieved without CPU drag.

Figure 1:
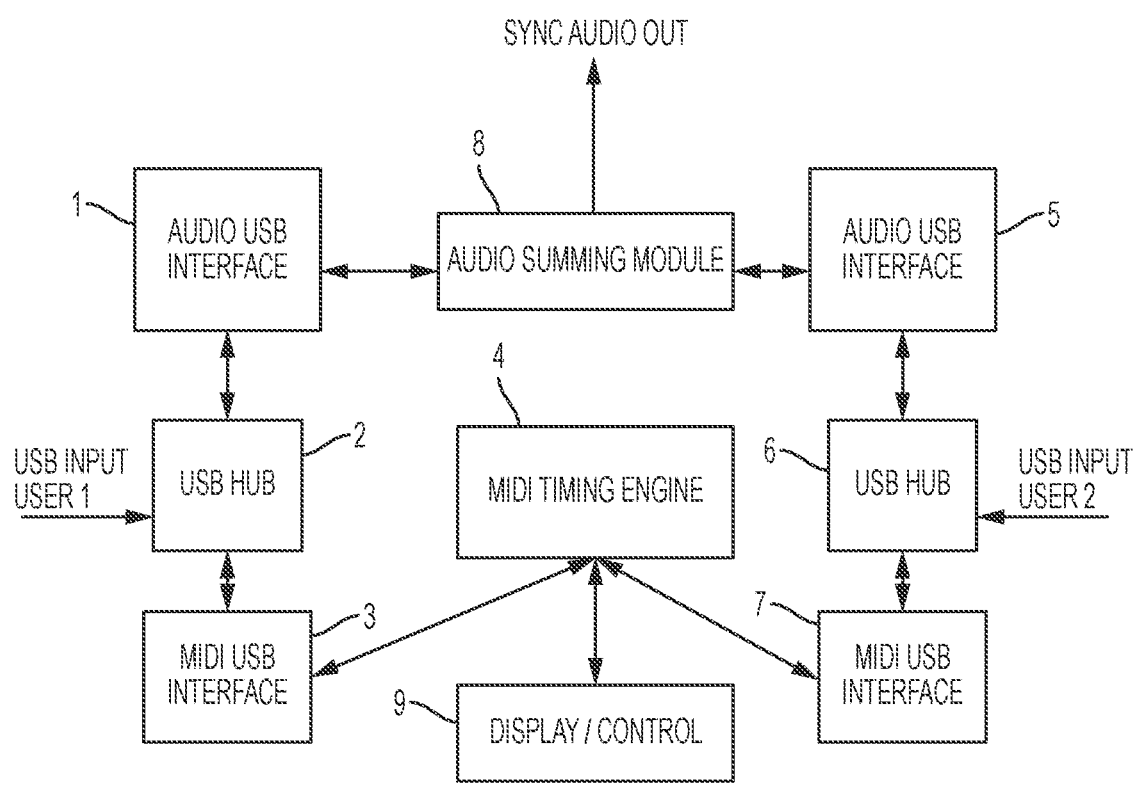
FIG. 1 shows a block diagram of an audio processing system for collaborative synchronized audio output according to an embodiment.

Referring to FIG. 1, a block diagram of an audio processing system for collaborative synchronized audio output is shown according to an exemplary embodiment. In general, the system receives two distinct audio signals from separate sources collaborating to produce for example a musical piece (in digital file form). In one example, the audio signal sources may be from two computers using DAW software that produce their own musical file. As will be understood, the two audio signals may have start/stop times that are slightly different from the other signal as a result of the CPU drag from each other's respective computer so that either of the two audio signals may be the source of the drag.

The system generally includes a first USB audio input hub (2) for receiving the first audio signal from the first digital audio workstation. In some embodiments, the USB audio hub (2) may include a first audio USB interface (1) and a first MIDI USB interface (3). Running in parallel with the USB audio hub (2) is a second USB audio hub (6). The USB audio hub (6) may include a second audio USB interface (5) and a second MIDI USB interface (7). The audio USB interfaces (1) and (5) may be for example, circuit boards with circuits including for example one or more processors for controlling and processing their respective audio signal inputs before being combined. The MIDI USB interfaces (3) and (7) may also comprise circuit boards with circuits including for example one or more processors for coordinating timing passed on to their respective audio USB interface (1;5). A MIDI timing engine module (4) may be coupled to both the first USB audio input hub (2) and the second USB audio hub (6). A controller (9) which may have an integrated display may be connected to the MIDI timing engine module (4). The MIDI timing engine module 4 generates MTC timing signature signals and may also generate transport control commands (for example, start, stop, pause). The output end of the system may include a summing module (8). The summing module 8 may use digital or analog based summing (for example, i$^2$s standard, USB, or Thunderbolt® interface). In some embodiments, the summing module (8) may be software (including for example, a run-time application or configuration script) run by, or firmware executed by a microcontroller unit or other on-board processor.

Figure 2:
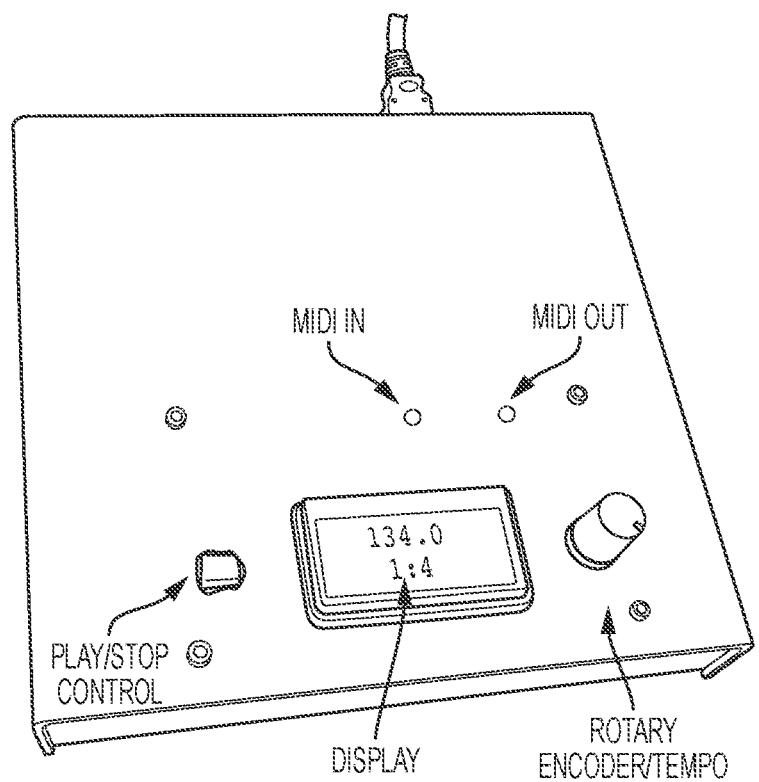
FIG. 2 shows a top perspective view of a collaborative synchronized audio interface system according to an embodiment.
Figure 3:
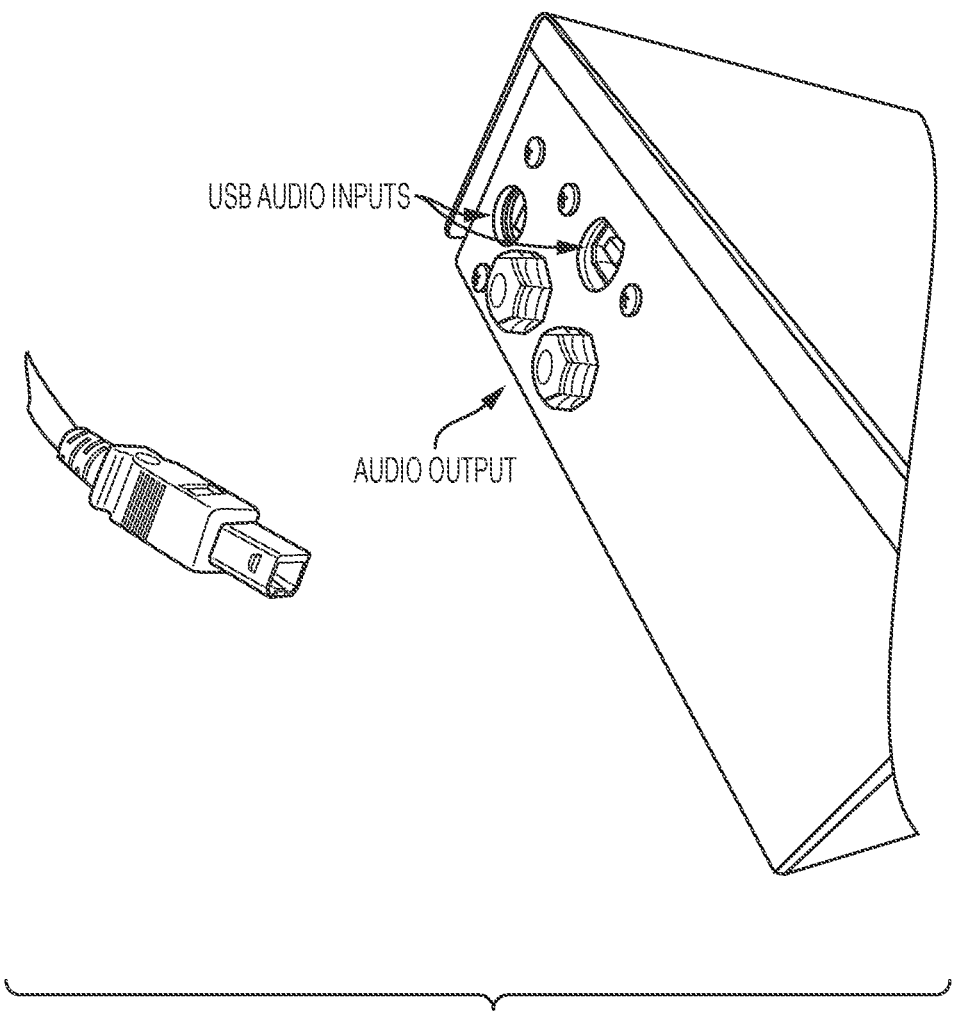
FIG. 3 shows a partial, enlarged rear view of the system of FIG. 2.

Referring now to FIG. 1 along with FIGS. 2-3, in some embodiments the system comprises a small desktop housing. Some embodiments include a digital display, a rotary encoder for selecting items on the display, a play/stop button for generating transport control messages, and MIDI IN/OUT interfaces (FIG. 2) The rear of the housing may include two USB audio inputs and may also have two analog or digital audio outputs (FIG. 3).

In operation, USB input (audio signals) is taken from a first and second users' respective computers with DAW software that all commonly interface with USB and MIDI control messages. The USB hubs (2)(6) may also be used to interface with MIDI interface boards (3)(7). MIDI start/stop commands are generated by the MIDI timing engine module (4) and sent along with the MTC timing signature signal(s). The MTC timing signature signal may be triggered for example by the controller (9) in response to user input. When a MIDI based message is generated, the message may broadcasted to both USB audio hubs (2) and (6). The MIDI USB interfaces (3) and (7) may receive the MTC timing signature signals. These messages may trigger start/stop commands in the DAW software by interpretation of MTC messages so that the timing of the first and second audio signals are in alignment. MIDI messages can generate in either one of the DAW computers and/or at the PLAY/STOP trigger from the audio interface. A key command selected by software will be monitored by a daemon application, this application will wait for a key combination, for example: CTRL-S. Once the daemon application recognizes the key command, it will send a signal back to the audio interface's midi timing engine module (4), at which time the timing engine module (4) will process this and send a MIDI Start/Stop command back to the DAWs to start/stop in sync. USB Audio is then outputted and combined by summing (via the summing module (8)) and/or by combining the synchronized audio signals into a combined audio stream. The combined stream may be analog or digital.

Figure 4:
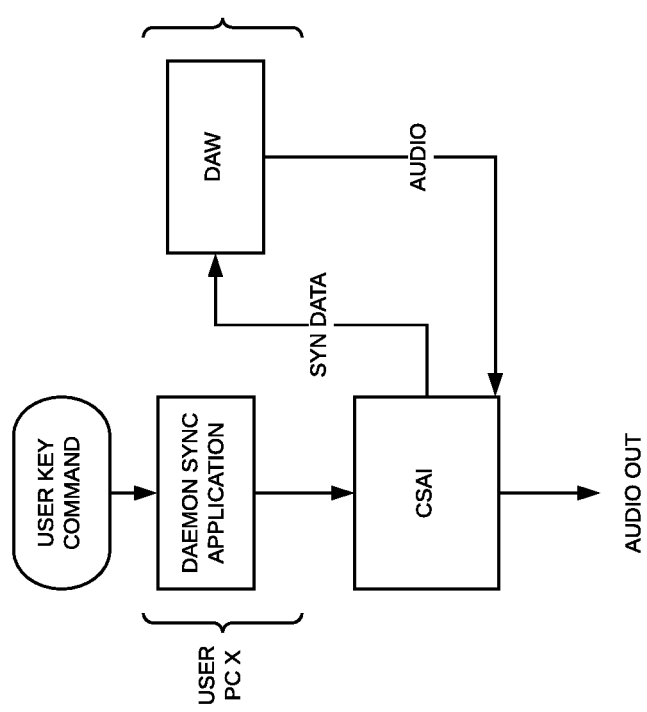
FIG. 4 is a block diagram of an audio processing system for collaborative synchronized audio (CSA) output including a synchronization application for publishing a start/stop command issued by one of the users showing a flow of data between elements according to an embodiment.
Figure 5:
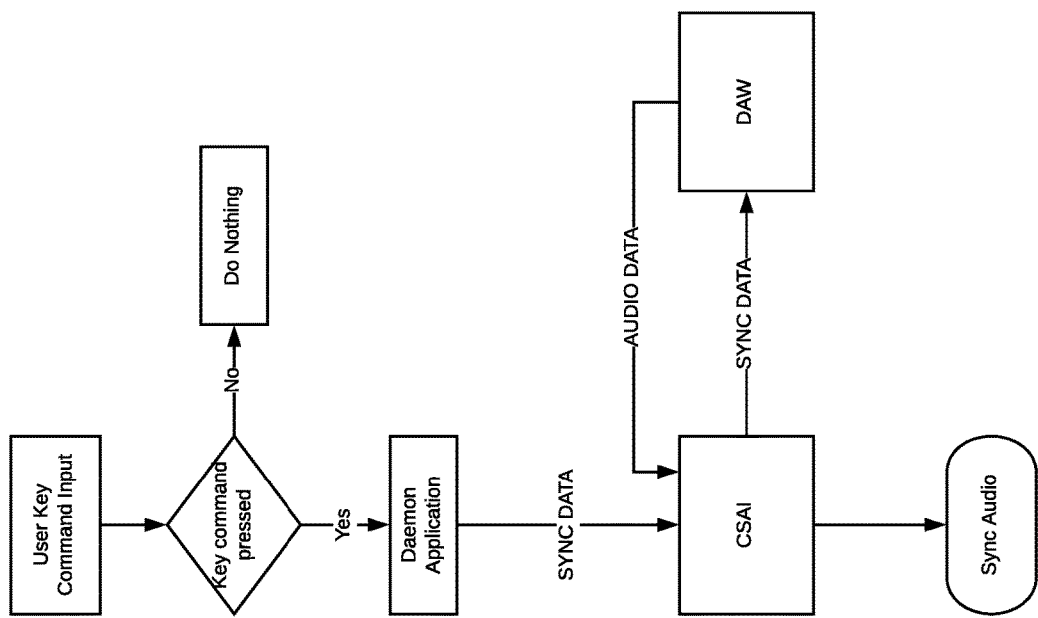
FIG. 5 is a flowchart of a process for publishing a start/stop command by a user to a CSA device using a pressed key command according to an embodiment.
Figure 6:
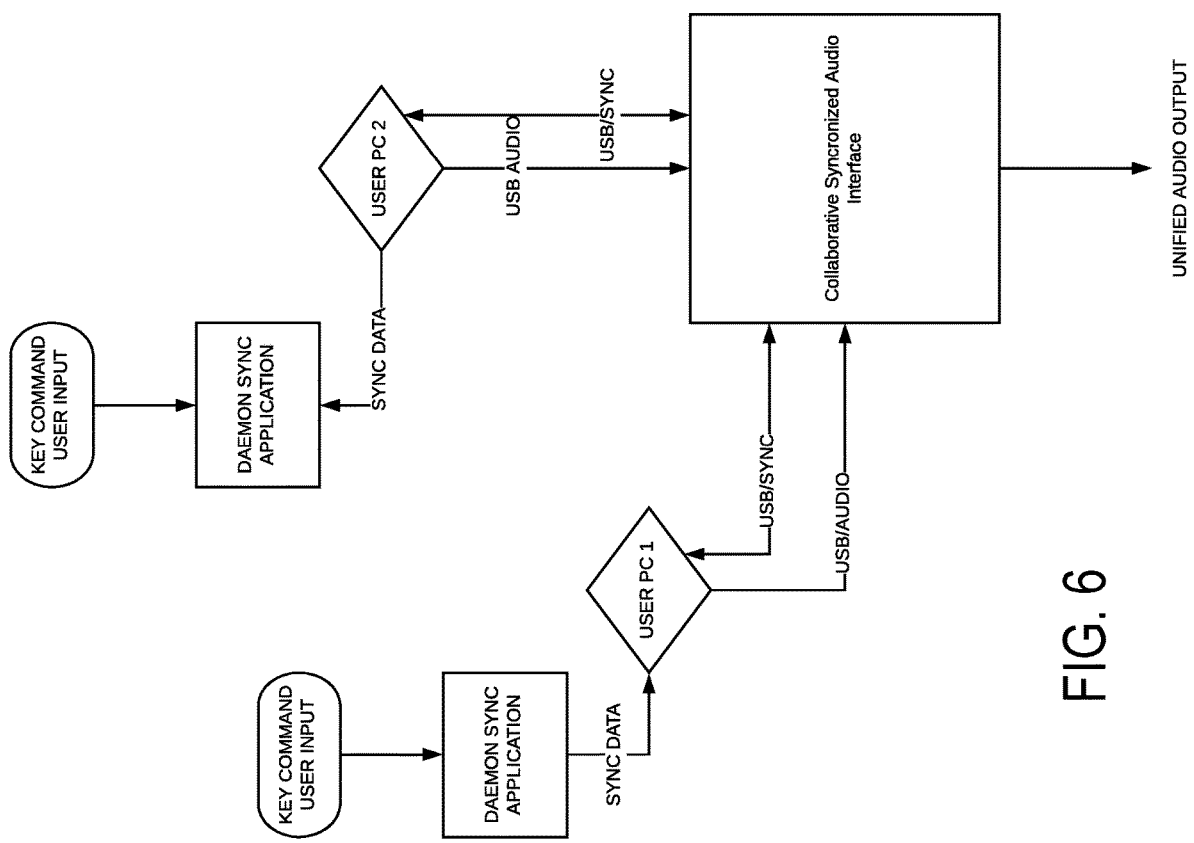
FIG. 6 is a block diagram of an audio processing system for CSA output including a synchronization application for publishing a start/stop command to users collaborating on a synchronized audio output signal according to an embodiment.

Referring now to FIGS. 4-6, embodiments related to a synchronization process that publishes a start/stop command to collaborating users are shown according to exemplary embodiments. An exemplary embodiment of the process is a software application. The application may use a daemon-based synchronization that may be implemented in correlation with a collaborative synchronized audio interface (such as embodiments described above with respect to FIGS. 1-3) and the MTC signal to synchronize playback across multiple connected Digital Audio Workstations (DAW).

In a collaborative synchronized audio interface (CSAI) workflow (FIG. 6), there is more than one digitally connected user. Through the CSAI process, each user's DAW has the ability to be synchronized to all other DAWs for unification of audio playback. This may be done through a timing engine which controls start/stop operations sent to the DAW.

In a traditional CSAI device, there will be a mechanical pushbutton that will start/stop the synchronization engine. As will be appreciated, aspects of the disclosed process embodiments decentralize the mechanical playback. The background daemon sync application monitors human keyboard interface for registering a sync command (for example, a key command pressed on the interface as shown in FIG. 5) by one of the users. In an exemplary embodiment, the process may monitor for a specified key combination. Once this key combination has been pressed by one of the users, the daemon application will send a synchronization start/stop command back to the CSAI, which will then be published back to all connected users' DAW without any latency for a synchronized start/stop event. As will be appreciated, the daemon application helps users to signal to other users when one audio signal should be applied to the other audio signal. As such, each user can review and suggest timing changes or provide feedback on the audio input which visually facilitates the collaboration efforts of all parties.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media may be utilized. In the context of this disclosure, a computer readable storage medium may be any tangible or non-transitory medium that can contain or store a program) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Aspects of the disclosed invention are described below with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An audio processing system for providing collaborative input of music streams, comprising:
a housing including:
a first USB audio input hub for receiving a first audio signal from a first digital audio workstation,
a second USB audio input hub for receiving a second audio signal from a second digital audio workstation,
a musical instrument digital interface (MIDI) timing engine coupled to the first USB audio input hub and to the second USB audio input hub, the MIDI timing engine generating a MIDI time code (MTC) timing signature signal provided to the first USB audio input hub and to the second USB audio input hub;
a controller coupled to the MIDI timing engine, configured to synchronize transmission of the first audio signal from the first digital audio workstation through the first USB audio input hub with the second audio signal from the second digital audio workstation through the second USB audio input hub using the MTC timing signature signal;
a summing module coupled to the first USB audio input hub and to the second USB audio input hub, the summing module configured to:
sum the synchronized output of the first audio signal from the first digital audio workstation from the first USB audio input hub with the second audio signal from the second digital audio workstation from the second USB audio input hub, and
output the synchronized and summed first audio signal and second audio signal as a combined audio signal; and
a software application executed by the controller, where the controller is further configured to:
monitor for a synchronization command registered by the first digital audio workstation,
send the synchronization start/stop command to the controller, and
publish the synchronization start/stop command to the second digital audio workstation for a synchronized start/stop event.

2. The audio processing system of claim 1, wherein:
the first USB audio input hub includes:
a first audio USB interface, and
a first MIDI USB interface; and
the second USB audio input hub includes:
a second audio USB interface, and
a second MIDI USB interface.

3. The audio processing system of claim 2, wherein the timing engine is connected to the first MIDI USB interface and to the second MIDI USB interface.

4. The audio processing system of claim 3, wherein the MTC timing signature signal is provided to the first MIDI USB interface and to the second MIDI USB interface.

5. The audio processing system of claim 2, wherein the summing module is connected to the first audio USB interface and to the second audio USB interface.

6. The audio processing system of claim 5, wherein:
the first audio USB interface receives the first audio signal from the first digital audio workstation synchronized in time according to the MTC timing signature signal with the second audio signal from the second digital audio workstation received by the second audio USB interface.

7. The audio processing system of claim 6, wherein the summing module receives the first audio signal from the first audio USB interface synchronized in time according to the MTC timing signature signal with receipt of the second audio signal the second audio USB interface.

8. The audio processing system of claim 1, wherein the summing module is analog based and the output of the combined audio signal is analog.

9. The audio processing system of claim 1, wherein the monitoring step for a synchronization command includes monitoring for a specified key combination.

10. A method of providing collaborative input of music streams, comprising:
receiving at a first USB audio input interface, a first audio signal from a first digital audio workstation,
receiving at a second USB audio input interface, a second audio signal from a second digital audio workstation,
receiving a user input at a controller to synchronize the first audio signal with the second audio signal;
generating, in response to the received user input at the controller, a musical instrument digital interface (MIDI) time code (MTC) timing signature signal;

broadcasting the MTC timing signature signal simultaneously to the first USB audio input interface and to the second USB audio input interface;

monitoring for a synchronization command registered by the first digital audio workstation;

publishing the synchronization command from the first digital audio workstation to the second digital audio workstation;

receiving a start/stop command from the second digital workstation in response to receiving the synchronization command;

starting/stopping receipt of the second audio signal from the second digital audio workstation;

combining the first audio signal with the second audio signal in synchronization according to the MTC timing signature signal and the starting/stopping receipt of the second audio signal; and outputting the combined and synchronized first audio signal and second audio signal as a combined audio stream.

11. The method of claim 10, further comprising transmitting to the first USB audio input interface and to the second USB audio input interface, start, stop, and pause command signals applied to the first audio signal and the second audio signal based on the MTC timing signature signal.

12. The method of claim 10, wherein the monitoring step for a synchronization command includes monitoring for a specified key combination.

* * * * *